Patented Nov. 19, 1940

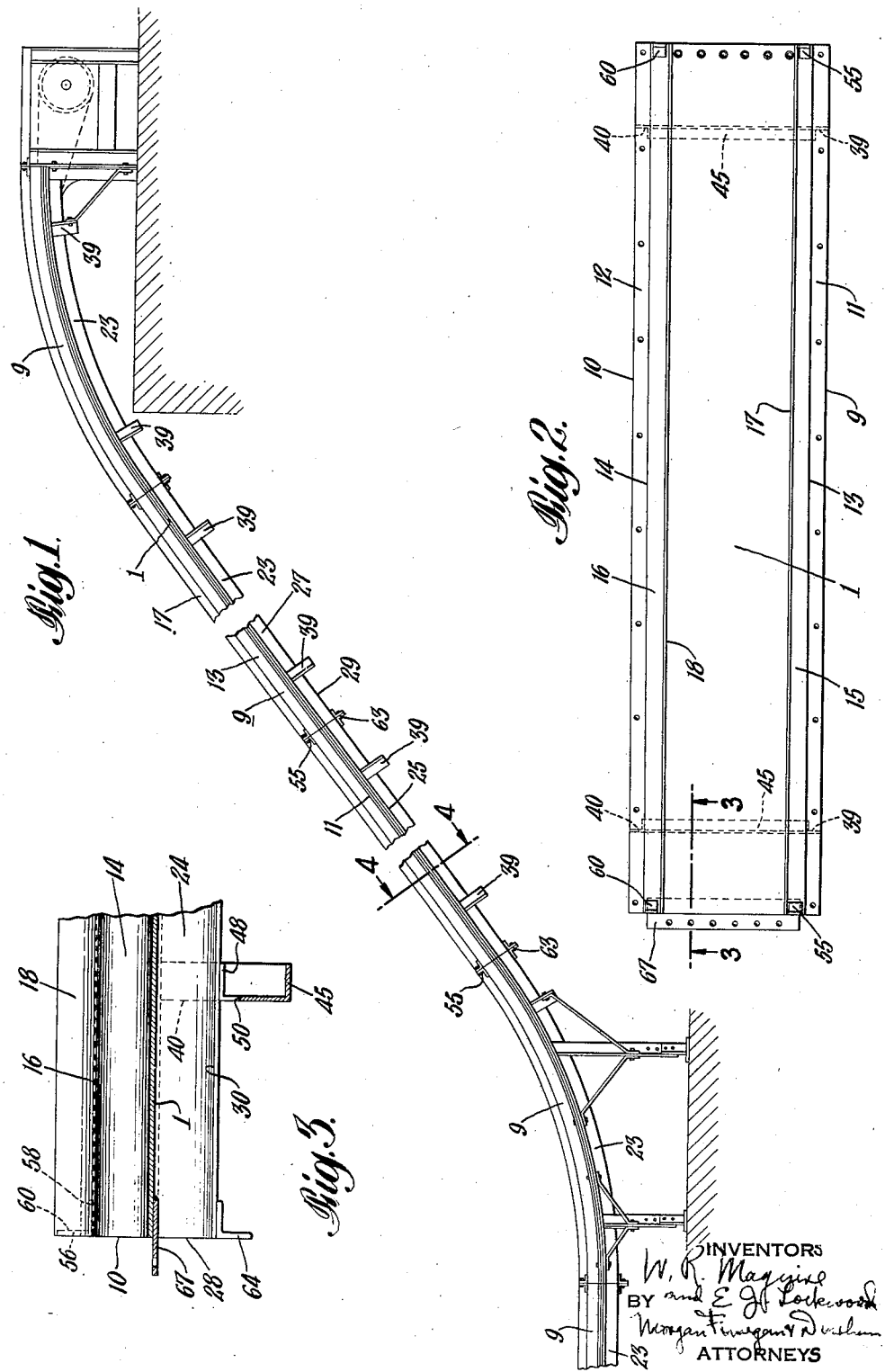

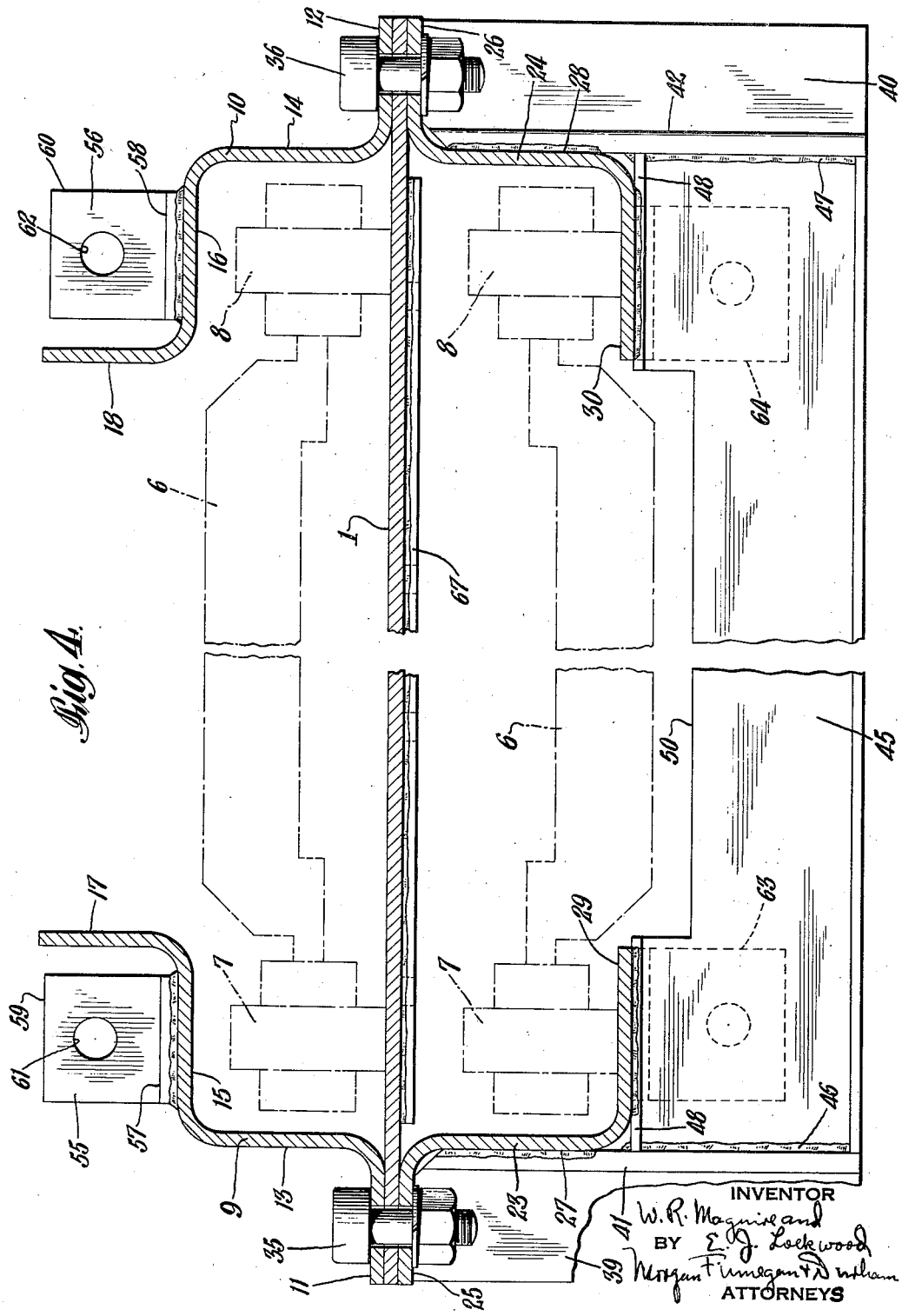

2,222,316

UNITED STATES PATENT OFFICE 2,222,316

CASE CONVEYER

Walter R. Maguire, Manhasset, and Edwin J. Lockwood, Peekskill, N. Y., assignors to Walter Maguire Company, Inc., New York, N. Y., a corporation of New York Application January 3, 1938, Serial No. 183,051

1 Claim. (Cl. 198—168)

The invention relates to new and useful improvements in endless conveyers and more particularly to such improvement in supporting means for conveyed articles, such as bottle cases or the like, and guiding and housing means for the endless conveyer.

The accompanying drawings, referred to herein and constituting a part hereof, illustrate one embodiment of the invention, and together with the description, serve to explain the principles of the invention.

Of the drawings:

Fig. 1 is an elevation of a conveyer embodying the invention;

Fig. 2 is a detached top plan of one section of the conveyer shown in the central part of Fig. 1;

Fig. 3 is an enlarged vertical section on line 3—3 of Fig. 2; and

Fig. 4 is an enlarged section on line 4—4 of Fig. 1.

Objects of the invention are to provide an endless conveyer mechanism which is sturdy, simple, compact, durable and relatively inexpensive; to provide such a mechanism wherein the parts are constructed and arranged for both functional efficiency as a conveyer and to provide stiff and strong structural units which are highly resistant to flexure and vibration, and are self-supporting for relatively long reaches; to provide such a mechanism in unit sections which are readily and strongly attachable to and detachable from each other; to provide interchangeable units of the kind described; to provide for easy accessibility of all parts for cleaning, adjustment and repair, and to provide for ready and simple supply and removal of the conveyed bottle cases or other articles.

To these ends and others, a conveyer unit is provided having a longitudinally-extending support for the articles conveyed, and fixed to and extending along the top side edges thereof, throughout the unit length, are transversely angled, upwardly-extending plates, formed to provide guides and housings for the conveyer and to act as structural girder-like stiffeners. Likewise, fixed to and extending along the nether side edges of the article supporting member, throughout the length of the unit, are similar transversely-angled, downwardly-extending plates, formed to provide supports, guides and housings for the idle returning reach of the conveyer. The three abutting plates along both side edges of the unit are firmly fastened together to constitute a strong, rigid, unitary structure. This gives a simple, inexpensive and remarkably compact structure, and the angled side plates in addition to their functions in the conveying mechanism act as stiffening girders, serving to eliminate flexure and vibration and permitting the use of units of great length or span. Other features of the invention will be set forth hereinafter, and it will be understood that the foregoing general description and the following detailed description as well are illustrative and exemplary but are not restrictive of the invention.

Referring now in detail to the embodiment of the invention illustrated by way of example in the accompanying drawings, the unitary conveyer structure comprises a support along which the bottle cases, or other conveyed articles are propelled by the conveyer mechanism. As embodied, this support is in the form of a plate or web 1 along which the cases slide when engaged by the flights of the conveyer. This plate is continuous as to length throughout the conveyer as a means for supporting the cases, and when the conveyer is constructed as a plurality of interchangeable units, the plates and the entire unit are constructed to be joined together at their ends. The plate or web 1 is preferably but not necessarily flat and integral. The conveyer is of the endless flexible type, with an active reach (an upper reach as embodied), propelling the cases forwardly, and an idle or returning reach, the lower reach in the present embodiment. The conveyer may be of various forms so far as concerns certain aspects of the invention, and the details thereof are not shown or described herein. As shown, there is an endless flexible chain at each side which supports cross flights 6. This conveyer structure is supported at either side upon series of rollers 7 and 8, which are supported upon and roll along the supporting plate 1, in the upper or active reach of the conveyer.

Means are provided serving as housings and guides for the conveyer rollers 7 and 8 in the upper active reach of the conveyer. As embodied, said means comprise plates 9 and 10 extending along and fixed to the top side edges of the plate 1 throughout the length of the conveyer unit (Figs. 1 and 2). These two top side plates are of multi-angular form in transverse cross-section, the various angles or flanges having various functions, as later described.

These plates have outwardly extending supporting reaches or faces 11 and 12, respectively, that rest upon the upper surface and along the side edges of the plate 1, and are firmly fixed to plate 1 to form a unitary structure. These plates next have integral upwardly extending reaches or faces 13 and 14, and integral with these are horizontal inwardly extending faces or reaches 15 and 16, and each of the plates has a final upwardly extending face or reach 17 and 18. The vertical and horizontal reaches 13 and 15 of plate 9 constitute a housing and guideway for the series of rollers 7 on one side of the conveyer, and the vertical and horizontal reaches 14 and 16 of plate 10 on the other side constitute a housing and guideway for the series of rollers 8 at the other side of the conveyer. The final upwardly extending reaches 17 and 18 of these respective side members constitute side guides for the cases of bottles or other articles being conveyed. In addition to their functions in the conveyer, these side plate members operate as girders to powerfully stiffen the structure and to prevent deflection and vibration.

Means are provided by the invention, likewise structurally united with the mechanism already described for supporting, housing and guiding the idle returning reach of the flight conveyer. As embodied, plates 23 and 24 extend along and are fixed to the nether side edges of the plate 1, throughout the length of the unit. These plates (Figs. 1 and 4) are also of multi-angular form in transverse cross-section, the various angles or reaches having various functions. These plates have faces or reaches 25 and 26, respectively, which abut against and extend along the underside of the edges of the plate 1, just beneath and in alinement with the reaches or flanges 11 and 12 of the upper plates 9 and 10. The three plates at each edge of the unit are firmly fastened together to constitute one unitary structure. Each of the plates 23 and 24 next have integral downwardly-extending reaches 27 and 28, and these terminate, respectively, in horizontally and inwardly extending reaches or faces 29 and 30. These downwardly and horizontally extending reaches of these two plates 23 and 24 constitute guides, housings and supporting trackways for the series of rollers 7 and 8 at each side of the idle return reach of the conveyer, the rollers rolling along the top surfaces of the reaches 29 and 30, respectively. The outer side of the supporting plate 1 and the alined and abutting foot reaches of the guiding and housing members 9 and 23, at one side of the structure, are firmly fastened together by suitable means, shown herein as a series of bolts 35, and in like manner on the opposite side of the structure, the side edge of the supporting plate 1 and the alined and abutting foot reaches of the guiding and housing members 10 and 24 are firmly fastened together by a series of bolts 36. The entire structure is thus of very simple construction, having few parts, very compact in space, and the parts are designed to perform their mechanical functions and also to provide a very stiff and rigid girder construction to withstand deflection and vibration, and to render practicable conveyer units of very long span.

Further strengthening and stiffening means for the unit conveyer structure are optionally provided, and are provided at spaced-apart points along each unit of the conveyer. As embodied, these constitute yoke-like members fixed to and embracing the lower half of the conveyer structure. In said structures, angle beams 39 and 40 are vertically arranged at either side, with their top ends abutting on and fastened to (as by welding) the underside of the foot reaches 25 and 26 of the two nether guiding and housing plates 23 and 24 for the lower conveyer reach. One flange of each of the angles 41 and 42, respectively, abuts flatly on the outer faces of the downwardly-extending reaches 27 and 28 of these members 23 and 24 and are welded thereto. A transversely-disposed channel bar 45 is welded at either end, as shown at 46 and 47, to the abutting flat flanges 41 and 42, respectively, of the downwardly-extending angles 39 and 40. The top horizontal reach 48 or flange of the channel bar 45 abuts upon the outer lower surface of the reaches 29 and 30 of the nether members 23 and 24 and is welded thereto. With the particular form of conveyer shown, the upper central part of the reinforcing beam 45 is cut away, as shown at 50, to give clearance for the passage of the conveyer flights. These reinforcing yokes further greatly strengthen the structure against deflection or vibration.

Suitable means are provided for connecting and disconnecting, and for firmly holding together the ends of the conveyer units. As embodied angle plates 55 and 56 have their horizontal reaches or flanges 57 and 58 resting upon and welded to the top of the horizontal reaches 15 and 16 of the upper guideway. The vertical reaches 59 and 60 abut against similar plates on the next abutting conveyer unit, and fastening bolts pass through the holes 61 and 62 and hold the units firmly together. Similar plates 63 and 64 are welded to the under faces of the horizontal reaches 29 and 30 of the nether conveyer track and are likewise bolted together to hold the two units firmly united. At the abutting ends of the two supporting plates 1, a transversely-extending plate 67 overlaps the two abutting plates 1 on the underside thereof, and is fastened to each of the plates by any suitable means, such as welding or blind bolts or any other suitable device.

In Fig. 1 the straight central reach of the conveyer is constructed of units such as described herein, and operates in accordance with the present invention, and the curved end sections of the conveyer may optionally be of the same or of some different structure as desired or as found expedient.

The invention in its broader aspects is not limited to the specific mechanisms shown and described but departures may be made therefrom within the scope of the accompanying claim without departing from the principles of the invention and without sacrificing its chief advantages.

What we claim is:

A conveyer mechanism including in combination an unobstructed, smooth flat plate upon which cases are supported and along which they are conveyed, an endless flight conveyer having a series of rollers at each side of the flights, said rollers being supported directly upon and having rolling contact with the upper face of the plate, upper transversely-angled side plates extending along and resting upon the upper face of each side edge of said plate, one angled face of said side plates resting upon the outer part of said plate at each side edge thereof, said side plates having an adjoining upwardly extending face and then an inwardly extending face, said two faces of the side plates forming a housing and guideway for the rollers at each side of the conveyer, the side plates terminating in an upwardly extending face, said opposed, upwardly extending faces being spaced apart a lesser distance than the rollers and constituting guides for the sides of the conveyed cases, nether transversely-angled side plates extending along and engaging the underside of each side edge of said plate, one angled face of said nether side plates extending along and contacting with the outer part of said plate at each side edge thereof, said side plates having an adjoining downwardly extending face and then an inwardly extending smooth and unobstructed horizontal face, said two faces of the nether side plates forming a housing, guideway and support for the rollers at each side of the idle returning reach of the conveyer, all of said transversely angled side plates being securely affixed to said flat plate, thus also serving to make the conveyer mechanism substantially rigid and highly resistant to vertical flexure.

WALTER R. MAGUIRE.
EDWIN J. LOCKWOOD.